United States Patent [19]
Hoffmann et al.

[11] Patent Number: 4,782,705
[45] Date of Patent: Nov. 8, 1988

[54] STRAIN GAUGE

[75] Inventors: Horst Hoffmann, Pentling; Peter Kersten, Leonberg; Hans Volz, Schwieberdingen; Ulrich Seyfried, Stuttgart, all of Fed. Rep. of Germany

[73] Assignee: Alcatel N.V., Amsterdam, Netherlands

[21] Appl. No.: 73,355

[22] Filed: Jul. 10, 1987

Related U.S. Application Data

[63] Continuation of Ser. No. 821,638, Jan. 23, 1986, abandoned.

[30] Foreign Application Priority Data

Jan. 23, 1985 [DE] Fed. Rep. of Germany ....... 3502008

[51] Int. Cl.$^4$ .......................... G01L 1/00; H01L 43/06
[52] U.S. Cl. ..................................... 73/776; 338/32 H
[58] Field of Search ................. 73/763, 774, 775, 776, 73/777, 862.64, 862.65, DIG. 2, 708, 720, 721, DIG. 3; 338/2, 5, 6, 4, 32 H; 324/209, 776, 774

[56] References Cited

U.S. PATENT DOCUMENTS

| | | | |
|---|---|---|---|
| 3,399,056 | 8/1968 | Doi | 338/2 |
| 3,807,223 | 4/1974 | Juillerat et al. | 73/774 |
| 3,838,595 | 10/1974 | Godefroy | 73/776 |
| 3,858,138 | 12/1974 | Gittleman et al. | 336/136 |
| 4,373,397 | 2/1983 | Keller | 73/721 |
| 4,374,665 | 2/1983 | Koon | 73/DIG. 2 |
| 4,434,671 | 3/1984 | Yamashita et al. | 73/DIG. 2 |
| 4,561,314 | 12/1985 | Alley et al. | 73/862.69 |
| 4,649,755 | 3/1987 | Volz | 73/861.78 |

FOREIGN PATENT DOCUMENTS

| | | | |
|---|---|---|---|
| 0042166 | 4/1979 | Japan | 73/708 |
| 0154637 | 11/1981 | Japan | 73/720 |
| 0084477 | 5/1983 | Japan | 338/32 H |

OTHER PUBLICATIONS

J. Appl. Phys. 52(3), Mar. 1981, "Applicability of the Planar Hall Effect", pp. 2468-2470 (Author: Jan H. Fluitman).

Phys. Stat. Sol., 26, 585 (1968), "Planar Hall Effect in Ferromagnetic Films", pp. 565-569 (Author: Vu Dinh Ky).

Ort, The Latest In-Foil Strain Gauges Versus Thin Film Strain Gauges, Conference, 1978.

Tolman, "Monitoring the Magnetostriction of Thin Films During Vacuum Deposition", Review of Scientific Instruments, vol. 35, No. 6, 1964.

Primary Examiner—Stewart J. Levy
Assistant Examiner—Robert R. Raevis
Attorney, Agent, or Firm—Christie, Parker & Hale

[57] ABSTRACT

A strain gauge comprised of a premagnetized ferromagnetic film wherein any change in length of the film is converted into a planar Hall voltage by employing the property of magnetostriction and the planar Hall effect. Alternately, a change in the length of the film can also be measured as a change in electric conductivity by employing the properties of magnetostriction and magnetoresistance. The strain gauge is deposited on a substrate by thin-film techniques and has a very high sensitivity.

7 Claims, 2 Drawing Sheets

STRAIN GAUGE

CROSS-REFERENCE TO RELATED APPLICATIONS

This is a continuation of application Ser. No. 06/821,638 filed 01-23-86 now abandoned.

BACKGROUND OF THE INVENTION

1. Field of the Invention

The invention relates generally to strain gauges and more particularly to a strain gauge deposited upon a substrate by thin film techniques exhibiting very high sensitivity to any change in length or electrical conductivity.

2. Description of the Prior Art

Conventional strain gauges employ a plurality of metal-wire or metal-foil resistance elements or are constructed by thin-film techniques. They are used as sensors for measuring the parameters force, distance, weight, acceleration or pressure. The most commonly used train gauges are piezoelectric semiconductor crystals as described in German Patent DE-AS No. 23 49 463. They can be used to measure the piezoelectric effect directly and the conductivity change caused by the piezoelectric effect. The strain is, in most cases, mounted indirectly by cementing or screwing the crystal to a substrate to be tested. Exceptions are those strain gauges which are made by thin-film techniques but like all piezocrystals, must be oriented according to their structure. As a rule, the indirect mounting causes a hysteresis. In addition to the hysteresis of the piezoelectric effect, a measurement inaccuracy results between elongation and compression. The crystalline structure of the strain gauge which is easily broken does not permit any sharp bending of the piezoelectric crystal. This problem limits the range of application of the piezoelectric semiconductor crystals.

In measuring the piezoelectric effect, fast aging is particularly disadvantageous because it necessitates continuous recalibration. Very reliable strain gauges are elements which are formed by a metal strip and in which strain causes a resistance change as a result of a change in the cross-section and the length of the strain gauge. This change is very small so that the strain measurement obtained is not very accurate.

SUMMARY OF THE PRESENT INVENTION

It is therefore an object of the present invention to provide an improved strain gauge having high sensitivity.

It is a further object to provide an improved strain gauge which is easy to manufacture relative to comparable strain gauges heretofore available.

It is a further object to provide an improved strain gauge having a plurality of uses.

According to the invention, the objects are achieved by making the strain gauge of a ferromagnetic, magnetically anisotropic, magnetostrictive material which exhibits galvanomagnetic effects. The strain gauge according to the invention represents an improvement over conventional strain gauges. Because of an amorphous structure, the strain gauge is easy to manufacture and can be mounted on the substrate just like the metal strip but has the high sensitivity of the semiconductor crystal. Thus, the strain gauge of the present invention combines the advantages of conventional strain gauges without having their disadvantages. In addition, the instant strain gauge has a greater strain range than conventional strain gauges due to its amorphous property. The use of thin-film techniques facilitates the formation of the electrical contacts. The strain gauge of amorphous metal is produced by evaporation or sputtering. The thin-film is deposited on a substrate, and the desired shape of the area is then etched photolithographically. The thin-film has a length of 3 mm, a width of 1 mm, and a thickness ranging between 10–100 nm.

To impress the magnetic anisotropy, the film is annealed at a temperature T=300° C. in the presence of a magnetic field whose direction is, e.g., parallel to the plane of the thin layer and which has a magnetic intensity of H≧60 Oe. The process takes four hours with the direction of magnetization so impressed being the energetically most favorable direction. At room temperature, the magnetization will always align itself in this most favorable direction which is referred to as the "easy direction." The sensitivity of the strain gauge may be increased by re-annealing the armorphous film for a period of four hours at a temperature T=300° in the presence of a rotating magnetic field having an intensity H≧60 Oe . Such a treatment will reduce the magnetic anisotropy, which in turn will cause an increase in the sensitivity of the strain gauge.

The operation of the strain gauge is based on the interaction of several physical properties. Magnetization causes an anisotropy of the conductivity. The magnetostrictive behavior causes a change in the direction of magnetization whenever the strain gauge is subjected to tension and/or compression. In proportion to the mechanical stress, the magnetization changes its direction up to 90°. The measurement range of the strain gauge is determined by the anisotropy field strength ($H_k$) which in turn, depends on the material used and on the magnetic pre-treatment. Since the axis of the anisotropy of the conductivity rotates with the magnetization, the electrical resistance between two points whose straight connecting line lies perpendicular to the axis of rotation changes in proportion to the mechanical stress. An elongation or compression can thus be measured as a change in electrical conductivity.

As a second galvanomagnetic effect, besides magnetoresistance, the planar Hall effect is used for strain measurement. For this purpose, another arrangement of the strain gauge is chosen so that a driving current flows through the thin-film, like in the normal Hall effect. A magnetic field is required for diverting the charge carriers from their original direction through the Lorentz force. The driving current flows in one direction. The component of a magnetic field which is perpendicular to the direction of current flow now causes the charge carriers to be deflected in a third direction which is perpendicular to the other two directions. The Hall voltage is provided in this third direction. For this purpose, however, the strip-like resistance strain gauge must be bonded to the substrate via one side surface. The strain gauge according to the invention makes use of the planar Hall effect, thus permitting the connection of the large strip area to the substrate. This means that the driving current flows in the plane of the thin-film and that the magnetization also lies in this plane. In the non-strained state, the magnetization and the driving current are parallel to one another. Accordingly, there is no magnetic component perpendicular to the driving current and thus, no Hall effect (either planar or normal). When the magnetization is rotated, a magnetic component and thus, a Hall voltage are developed. The planar Hall voltage is measured perpendicular to the direction of the driving current in the plane containing the driving current and the magnetization.

An advantage of the strain gauge of the present invention is that the sensitivity is very high.

Another advantage is that the strain gauge is easy to manufacture relative to comparable strain gauges heretofore available.

A further advantage is that the strain gauge has a plurality of uses.

IN THE DRAWING

In the following, the invention will be explained in greater detail with reference to embodiments shown in the accompanying drawings, in which.

DETAILED DESCRIPTION OF THE PREFERRED EMBODIMENT

Figure 1:
FIG. 1 is a planar view of a simple strain gauge.

FIG. 1 illustrates a resistance strain gauge referred to by the general reference character 20 and incorporating the present invention. The strain gauge 20 includes a substrate 22, a strip of an amorphous metal film 24 and a pair of contact 26 including a pair of endfaces 28.

Figure 2:
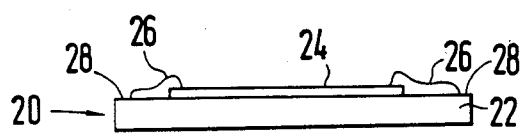
FIG. 2 is a side elevational view of the simple strain gauge of FIG. 1.

The strip of the amorphous metal film 24 is comprised of $Fe_{80}B_{20}$ and is deposited as the resistance strain gauge 20 on the substrate 22. The amorphous metal ($Fe_{80}B_{20}$) is derived from the formula $Fe_zB_{(100-z)}$ where $60 < z < 90$ (atom %). The "easy direction" which is energetically the most favorable direction for a magnetic field to be oriented when annealing the film strip 24 lies in the plane of the film strip 24 and is perpendicular to the longitudinal axis thereof. The pair of contacts 26 so provided at the ends of the film-strip 24 cover the endfaces 28 of the film-strip 24 and additionally, adhere to the substrate 22. This construction is shown most advantageously in FIG. 2 which is a side elevation of FIG. 1. The pair of contacts 26 are made of a CrAu or CoFeB alloy and are deposited by evaporation or sputtering. Any change in electrical conductivity between the pair of contacts 26 is the measure of the strain. The conductivity is measured by electrical apparatus (not shown). The embodiment illustrated in FIG. 1 is particularly suitable for digital strain indication. However, there is the risk of neighboring domains becoming magnetically short-circuited with portions of the domains being rotated out of the easy direction, even without strain.

Figure 3:
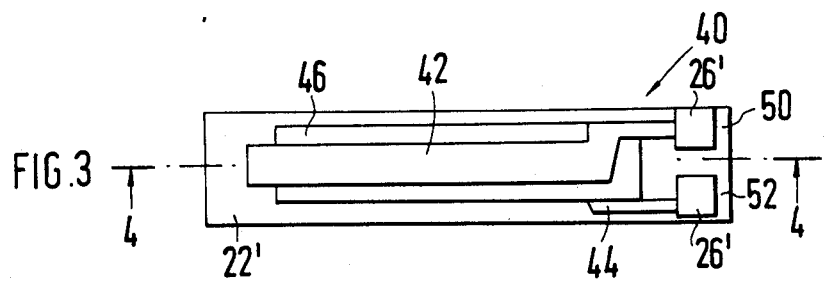
FIG. 3 is a planar view of a strain gauge having two gauge layers.
Figure 4:
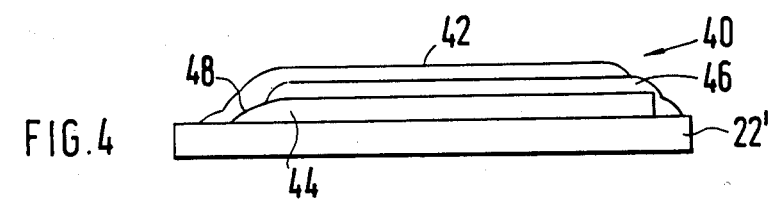
FIG. 4 is a cross-sectional view of the strain gauge taken along the line 4—4 of FIG. 3.

FIG. 3 illustrates a first alternative embodiment of the resistance strain gauge referred to by the general reference character 40 and incorporating the present invention. Each element of the first alternative embodiment which is common to a corresponding element of the preferred embodiment 20 is identified by a prime designation. The strain gauge 40 includes an upper film strip 42 and a lower film strip 44 separated by an intermediate film strip 46, a common first end 48 and a pair of contacts 26' located above a pair of second ends 50, 52, with each of the recited structures being mounted upon a substrate 22'. To have complete control over the formation of domains, the strain gauge 40 has two $Fe_{80}B_{20}$ gauge film strips, namely the upper film strip 42 and lower film strip 44. The latter are separated by the intermediate film strip 46 in such a way as to be in contact with one another at the common first end 48. The intermediate film strip 46 is comprised of an $SiO_2$ film. The pair of contacts 26' are deposited at the respective second ends 50, 52 of the upper and lower film strips 42, 44, as shown in FIG. 4. For this reason it is necessary to modify the shape of each film strip 42, 44 (as shown in FIG. 4) which are deposited on after the other by evaporation or sputtering. This arrangement results in only one domain being formed in each of the film strips 42, 44. The "easy direction" of each film strip 42, 44 is perpendicular to the longitudinal axis of the respective strip 42, 44, and the domains of each film strip 42, 44 are antiparallel with respect to the other. As in the preferred embodiment shown in FIGS. 1 and 2, strain is measured by evaluating the change in the direct current (D.C.) conductivity.

In the above embodiments, the measured signal still shows a hysteresis between elongation and compression. In order to suppress this hysteresis, the magnetization is super-imposed with an external alternating electromagnetic field of frequency (v), whose H-component is perpendicular to the "easy direction." Accordingly, the magnetization oscillates at the frequency (v) about the respective rest position which is determined by the strained state. The maximum frequency lies in the MHz range (1 HZ–100 MHz). The measured conductivity now oscillates (at the frequency (v) or (2 v) or at a combination of the two frequencies) about a median conductivity. Both the measured conductivity and the frequency at which it oscillates depend on the rest position of the magnetization under strain and the amplitude (respectively, the instantaneous amplitude and the peak-to-peak amplitude) of the external alternating field. The above described hysteresis effects may thus be compensated for by deriving the median conductivity from the oscillating measured conductivity. The corresponding arrangement is shown in FIGS. 5 and 6.

Figure 5:
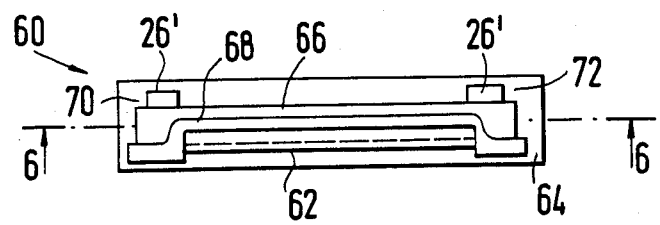
FIG. 5 is a strain gauge modulated by an alternating magnetic field.
Figure 6:
FIG. 6 is a cross-sectional view of the strain gauge taken along the line 6—6 of FIG. 5.

FIG. 5 illustrates a second alternative embodiment of the resistance strain gauge referred to by the general reference character 60 and incorporating the present invention. Each element of the second alternative embodiment which is common to a corresponding element of the preferred embodiment 20 is identified by a prime designation. The strain gauge 60 includes an amorphous $Fe_{80}B_{20}$ film 62, a substrate 64, an insulating film 66, a striplike cover film 68 and a pair of contacts 26'. The amorphous film 62 is deposited in the form of a strip on the substrate 64. The "easy direction" is parallel to the longitudinal axis of the film strip 62. The pair of contacts 26' are provided at a set of ends 70, 72 of the film strip 62. The amorphous film strip 62 is covered with the insulating film 66 which is comprised of $SiO_2$ and the contacts 26' remain free. Disposed over the insulating film 66 is the striplike conductive cover film 68 comprised of CrAu or Al, whose direction is parallel to the direction of the Fe$_{80}$B$_{20}$ film strip 62. An alternating current (A.C.) voltage applied thereat establishes an alternating magnetic field. The strain to be measured does not have to be applied parallel to the longitudinal axis of the film strip 62 but need only be transmitted via the resistance strain gauge 60. Since the signal varies periodically, each of the D.C. and A.C. voltage components can be electronically separated and the relevant signal can be further processed as a pure A.C. voltage signal. FIG. 6 is a cross-sectional view of the resistance strain gauge 60.

Figure 7:
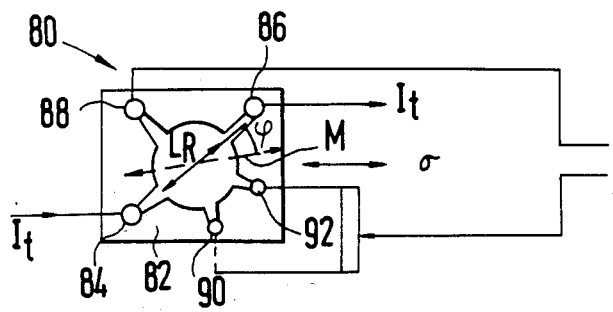
FIG. 7 is a strain gauge which provides the planar Hall voltage.
Figure 8:
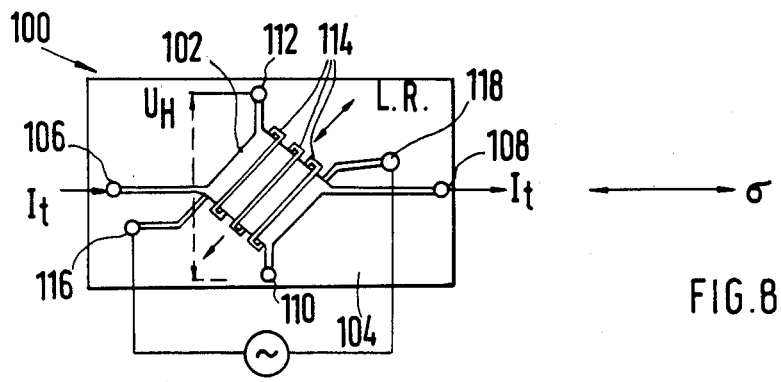
FIG. 8 is a strain gauge which provides the planar Hall voltage and which is modulated with an alternating magnetic field.

FIGS. 7 and 8 respectively illustrate third and fourth alternative embodiments of the resistance strain gauge with each employing the use of the planar Hall effect and each incorporating the present invention. FIG. 7 which illustrates a circular strain gauge is referred to by the general reference character 80 and includes a substrate 82 and a plurality of five contacts 84, 86, 88, 90 and 92. The five contacts 84, 86, 88, 90 and 92 of the circular strain gauge 80 are deposited onto the substrate 82. A driving current $I_t$ flows between the contacts 84 and 86. The planar Hall voltage ($U_H$) is developed across the contacts 88 and 90 including 92, the voltage drop in the direction of the driving current $I_t$ is taken from across the contacts 90 and 92 and can thus be considered in determining the Hall voltage. In the embodiment illustrated in FIG. 7, the angle between the direction of mechanical stress ($\sigma$) and the direction of the flow of driving current $I_t$ is preferably 45°; the "easy direction" (L.R.) is preferably parallel to the driving current $I_t$. Thus the angle $\phi$ between the direction of the magnetization M and the easy direction (L.R.) will range from 0° (when there is no stress and the magnetization therefore remains aligned in the easy direction) to ±45° (when the magnetization becomes aligned with the applied stress). Since the planar Hall voltage ($U_H$) is linearly proportional to sin (2$\phi'$), where $\phi'$ is the angle between the driving current $I_T$ and the magnetization M and is equal to $\phi$ in the FIG. 7 embodiment, the rate of change of the Hall voltage as a function of applied stress is maximum for small values of $\phi$, and thus the sensitivity of gauge is at a maximum for low levels of applied stress. When the driving current $I_t$ is constant, the strain can be read directly in terms of voltage values.

Superposing the magnetization with an alternating electromagnetic field as is done in the embodiments shown in FIGS. 3 through 6 when employing the property of magnetoresistance is also possible if the planar Hall effect is used. In this case, the sign of the magnetization enters into the measurement, that is, an A.C. voltage is applied as a Hall voltage. (If the property of magnetoresistance is employed, the pure A.C. voltage signal must first be produced by electronically separating the periodically varying D.C. voltage signal.) The Hall voltage, as in the embodiment shown in FIGS. 5 and 6, oscillates at the frequency of the alternating field (v) or at (2 v) or at a combination of these two frequencies. The measure of the strain is the amplitude of the Hall voltage which varies in proportion to the strain. FIG. 8 which illustrates the fourth alternative embodiment of the strain gauge employs the planar Hall effect and is referred to by the general reference character 100. The strain gauge 100 includes an amorphous film 102, a substrate 104, a plurality of electrical contacts 106, 108, 110 and 112 and a flat coil 114. The strain gauge 100 is a Hall probe. The amorphous film 102 is of square shape evaporated onto the substrate 104. The four electrical contacts 106, 108, 110 and 112 are provided at the corners of the square amorphous film 102. A driving current $I_t$ flows between the contacts 106 and 108 and the resultant planar Hall voltage is present at the contacts 110 and 112. The direction of strain ($\sigma$) is parallel to the direction of flow of the driving current $I_t$. The "easy direction" L.R. (which lies in the plane of the film 102) and the direction of strain ($\sigma$) make an angle of 45°. The alternating electromagnetic field is produced in a flat coil 114 whose windings extend parallel to the "easy direction." The alternating voltage is applied to the contacts 116 and 118 of the coil 114.

Figure 9:
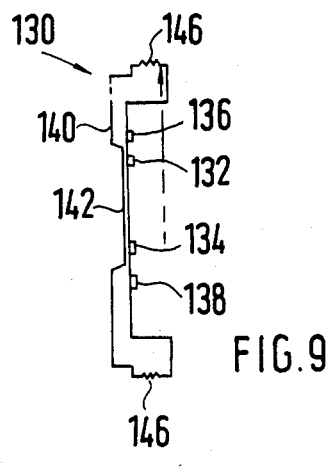
FIG. 9 is a strain gauge employed as a pressure gauge.
Figure 10:
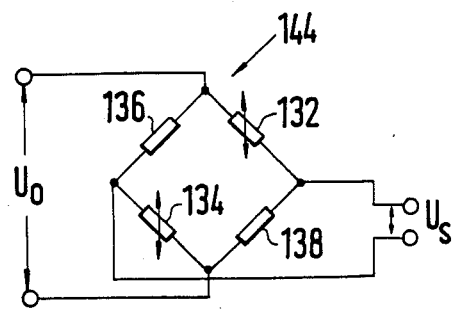
FIG. 10 is a bridge circuit employed for temperature compensation.

FIGS. 9 and 10 illustrate a fifth alternative embodiment of the strain gauge referred to by the general reference character 130 and incorporating the present invention. The strain gauge 130 of FIG. 9 includes a plurality of resistance strain gauges 132, 134, 136 and 38, a pressure transducer housing 140, a diaphragm 142 and a bridge circuit 144 with associated wiring and terminals (shown in FIG. 10) including a pair of auxiliary resistive elements 146 employed for resistive balancing purposes. In FIG. 9, the two resistance strain gauges 132, 134 are mounted on the diaphragm 142 within the housing 140 for use as a pressure transducer. The strain gauges 136 and 138 are not subjected to strain but serve temperature-compensation purposes when used in the bridge circuit 144 as shown in FIG. 10. The symbol $U_o$ denotes the applied voltage to the bridge circuit 144, and $U_s$ denotes the measured signal as a function of strain.

The strain gauge 130 according to the invention need not, of course, be made of an amorphous boron-iron alloy (positive magnetostriction coefficient). Of particular interest is an amorphous metal in the form of a nickel-iron alloy. In the case of Ni$_{81}$Fe$_{19}$ (atom %), the magnetostriction coefficient changes its sign, so that further designs are possible. Amorphous metals have the lowest coercivity that can be varied by alloys containing the metalloids B, C, Si, Ge, P, zirconium or niobium. Nevertheless, it is also possible to use transition metals of the iron group or an alloy consisting of transition metals of the iron group. Compared to the amorphous metals, however, such materials show a high coercivity and, consequently, cause aa broad hysteresis of the measured signal Us.

Although the present invention has been described in terms of the presently preferred embodiment(s), it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A planar Hall effect strain gauge comprising:
    a substrate;
    a two dimensional planar amorphous metal film disposed on said substrate, said film having an energetically favorable direction of magnetization in the plane of said planar film in first predetermined direction oriented approximately 45 degrees with respect to a second predetermined direction in the direction of a strain to be measured;
    means for providing a driving current across and in the plane of said planar film in a third predetermined direction having a component in said first predetermined direction; and means for measuring a planar Hall effect voltage across and in the plane of said planar film in a fourth predetermined direction having a component perpendicular to said first predetermined direction, whereby a strain applied to said gauge will result in a planar Hall effect voltage that may be measured by said measuring means.

2. The planar Hall effect strain gauge of claim 1 further comprising:

means for providing an alternating magnetic field in said plane in response to an alternating current with a maximum frequency less than 100 MHz, to thereby cause said planar Hall effect voltage to oscillate about a median voltage, the amplitude of said median voltage being measure of strain.

3. The planar Hall effect strain gauge of claim 2 where said means for providing an alternating magnetic field comprises a flat coil whose windings are parallel to said first predetermined direction.

4. The planar Hall effect strain gauge of claim 1 wherein said first predetermined direction and said third predetermined direction are parallel.

5. The planar Hall effect strain gauge of claim 1 wherein said first predetermined direction is perpendicular to said fourth predetermined direction.

6. A planar Hall effect strain gauge comprising:

a substrate;

a two dimensional planar amorphous metal film disposed on said substrate, said film having an energetically favorable direction of magnetization in the plane of said planar film in a first predetermined direction in the absence of any applied strain;

means for applying a strain across said film in a second predetermined direction in said plane different from first predetermined direction;

means for providing a driving current across and in the plane of said planar film in a third predetermined direction having a component in said second predetermined direction;

and means for measuring a planar Hall effect voltage across and in the plane of said planar film in a fourth predetermined direction having a component perpendicular to said first predetermined direction, whereby a strain applied to said gauge will result in a planar Hall effect voltage that may be measured by said measuring means.

7. The planar Hall effect strain gauge of claim 6 further comprising:

means for providing an alternating magnetic field in said plane to thereby cause said planar Hall effect voltage to oscillate about a median voltage, the amplitude of said median voltage being a measure of strain.

* * * * *

UNITED STATES PATENT AND TRADEMARK OFFICE
CERTIFICATE OF CORRECTION

PATENT NO. : 4,782,705
DATED : November 8, 1988
INVENTOR(S) : Horst Hoffmann; Peter Kersten; Hans Volz; Ulrich Seyfried It is certified that error appears in the above-identified patent and that said Letters Patent is hereby corrected as shown below:

In the Specification

| | |
|---|---|
| Column 4, Line 23 | Before "after" insert -- one --. |
| Column 6, Line 19 | Change "38" to -- 138 --. |
| Column 6, Line 46 | Change "aa" to -- a --. |

In the Claims

| | |
|---|---|
| Column 6, Line 63 | Before "first" insert -- a --. |
| Column 7, Line 18 | Before "measure" insert -- a --. |

Signed and Sealed this

Fourth Day of July, 1989

Attest:

DONALD J. QUIGG

*Attesting Officer*    Commissioner of Patents and Trademarks